United States Patent
Woehrle et al.

(10) Patent No.: US 10,437,571 B2
(45) Date of Patent: Oct. 8, 2019

(54) METHOD FOR PROGRAMMING A SAFETY CONTROLLER

(71) Applicant: PILZ GMBH & CO. KG, Ostfildern (DE)

(72) Inventors: Stefan Woehrle, Ostfildern (DE); Frank Von Haugwitz, Ostfildern (DE); Ralf Bauer, Ostfildern (DE)

(73) Assignee: PILZ GMBH & CO. KG, Ostfildern (DE)

( * ) Notice: Subject to any disclaimer, the term of this patent is extended or adjusted under 35 U.S.C. 154(b) by 110 days.

(21) Appl. No.: 15/349,287

(22) Filed: Nov. 11, 2016

(65) Prior Publication Data
US 2017/0147300 A1 May 25, 2017

(30) Foreign Application Priority Data
Nov. 24, 2015 (DE) .......................... 10 2015 120 314

(51) Int. Cl.
G06F 8/41 (2018.01)
G06F 9/445 (2018.01)
G05B 19/042 (2006.01)

(52) U.S. Cl.
CPC ........... *G06F 8/41* (2013.01); *G05B 19/0426* (2013.01); *G06F 9/44521* (2013.01);
(Continued)

(58) Field of Classification Search
CPC ............................... G06F 8/41; G06F 9/44521
(Continued)

(56) References Cited

U.S. PATENT DOCUMENTS 5,920,715 A * 7/1999 Heckel ............... G05B 19/0428
  700/3
5,970,243 A * 10/1999 Klein ...................... G06F 8/656
  717/113

(Continued)

FOREIGN PATENT DOCUMENTS

DE   10 2008 060 003 A1   5/2010
DE   10 2009 011 679 A1   8/2010

(Continued)

OTHER PUBLICATIONS

IEC 61131-1; Programmable controllers—Part 1: General Information, May 2003; 24 pp.

(Continued)

*Primary Examiner* — Duy Khoung T Nguyen
*Assistant Examiner* — Theodore E Hebert
(74) *Attorney, Agent, or Firm* — Harness, Dickey & Pierce, P.L.C.

(57) ABSTRACT

A user program for a safety controller is created by means of a program editor. The user program has a first program portion and at least one additional program portion. The first program portion defines safety-related logical dependencies between selected sensor signals and actuator signals. The user program is compiled and linked, in order to obtain an executable original program code. The original program code is transferred to a first memory of the safety controller and executed by a processor of the safety controller. The first program portion may be modified and compiled in order to obtain a modified first code portion. The modified first code portion is transferred to a second memory of the safety controller while the original program code is executed. The modified first code portion is then executed in addition to the original additional code portion and instead of the original first code portion.

14 Claims, 3 Drawing Sheets

(52) U.S. Cl.
CPC ............. *G05B 2219/13153* (2013.01); *G05B 2219/23333* (2013.01); *G05B 2219/36174* (2013.01)

(58) Field of Classification Search
USPC ........................................................ 717/154
See application file for complete search history.

(56) References Cited

U.S. PATENT DOCUMENTS

| | | | | |
|---|---|---|---|---|
| 7,286,886 | B2 * | 10/2007 | Klopfer | G05B 9/02 361/103 |
| 7,872,678 | B2 * | 1/2011 | Fuchs | H04N 5/361 348/143 |
| 8,307,356 | B2 * | 11/2012 | Klopfer | G05B 9/02 700/79 |
| 8,522,204 | B2 * | 8/2013 | Moosmann | G05B 9/03 717/117 |
| 8,595,827 | B2 * | 11/2013 | Zondler | G05B 9/02 700/20 |
| 9,128,480 | B2 * | 9/2015 | Reusch | G05B 19/41865 |
| 2005/0027379 | A1 * | 2/2005 | Dyk | G05B 9/02 700/79 |
| 2005/0060508 | A1 * | 3/2005 | Rischar | G05B 19/0428 711/163 |
| 2005/0203645 | A1 * | 9/2005 | Klopfer | G05B 9/02 700/79 |
| 2010/0192122 | A1 * | 7/2010 | Esfahan | G05B 19/0426 717/105 |
| 2012/0004744 | A1 * | 1/2012 | Reusch | G05B 19/0426 700/86 |
| 2012/0005748 | A1 * | 1/2012 | Zondler | G05B 9/02 726/21 |
| 2012/0036493 | A1 * | 2/2012 | Moosmann | G05B 9/03 717/105 |
| 2012/0078392 | A1 * | 3/2012 | Woehrle | G05B 9/03 700/86 |
| 2012/0197416 | A1 * | 8/2012 | Taira | G05B 9/02 700/14 |
| 2012/0296446 | A1 * | 11/2012 | Neupartl | G05B 19/0428 700/1 |
| 2017/0147300 | A1 * | 5/2017 | Woehrle | G06F 8/41 |

FOREIGN PATENT DOCUMENTS

| | | |
|---|---|---|
| DE | 10 2009 019 096 A1 | 11/2010 |
| EP | 1 515 205 A2 | 3/2005 |
| JP | 2013-148957 | 8/2013 |

OTHER PUBLICATIONS

EN ISO 13849-1; Safety of machinery—Safety-related parts of control systems—Part 1: General principles for design; Nov. 2006; 97 pp.
Safety of Machinery EN 62061 and EN ISO 13849-1; Edition II; Jun. 2012; 19 pp.
CEI IEC 61508-2; Functional safety of electrical/electronic/programmable electronic safety-related systems—Part 2: Requirements for electrical/electronic/programmable electronic safety-related systems; First edition; May 2000; 152 pp.
PSS 4000—Simplify your Automation™; All in One: Safety & Automation; Mar. 2015; 32 pp.
European Search Report dated Apr. 4, 2017; 8 pp.
Download ST—Bausteine → PSS; prior to Nov. 24, 2015; 1 page.

* cited by examiner

METHOD FOR PROGRAMMING A SAFETY CONTROLLER

CROSS-REFERENCES TO RELATED APPLICATIONS

This application claims priority under the Paris Convention from German patent application 10 2015 120 314.6 filed on Nov. 24, 2015. The entire content of this priority application is incorporated herein by reference.

BACKGROUND OF THE INVENTION

The present invention relates to a method for programming a safety controller and to a safety controller, which has a plurality of inputs for receiving sensor signals, a plurality of outputs for outputting actuator signals, and at least one processor for executing program code.

A typical example of a safety controller is available from Pilz GmbH & Co. KG, Felix-Wankel-Strasse 2, 72760 Ostfildern, Germany, under the brand name "Automation System PSS 4000". It is described in a company brochure titled "Automation System PSS 4000—Building Block System" from 2015.

Another example of a safety controller is disclosed by DE 10 2009 019 096 A1. This known safety controller comprises a plurality of hardware and software components, from which a user is able to put together an automation system according to the user's individual requirements. Depending on the size of the application, the system may comprise a plurality of control units which are connected to one another via a communication network, each control unit controlling sub-processes within a complex installation.

However, the invention is not limited to a complex system having a plurality of networked control units and may likewise be used for programming a "small" safety controller, which has a compact design and controls a few safety functions in an automatically operated machine or installation. Moreover, the invention is either not limited to a "pure" safety controller. Rather, it can also be used in control systems which control both safety-related processes (so-called FS or failsafe processes) and non-safety-related processes (so-called standard processes). A non-safety-related standard process typically relates to normal operation of an automated installation. Failures in the control system of this process may be problematic for economic reasons and should therefore be avoided if possible. However, they do not pose a risk to the health or the life of an operator or other persons in the vicinity of the installation. In contrast, safety-related control functions are primarily used to manage the hazards originating from an automated installation. For this reason, particular demands are made on the control system of safety-related processes in automation technology with respect to preventing and managing failures. Safety-related control systems and control components require a higher level of development effort and typically require special approvals, in particular according to the standards EN ISO 13849, EN/IEC 61508, EN IEC 62061, and others.

The PSS 4000 automation system is a safety controller that fulfils the requirements of the aforementioned standards, since it contains numerous components which have the required approvals for controlling safety-critical processes. In particular, numerous components meet the requirements in accordance with SIL 2 and higher according to EN/IEC 61508 and/or PL d in accordance with EN ISO 13849 and higher. In addition, however, the automation system PSS 4000 is also designed to control standard processes of a complex installation. Programming of the known safety controller may therefore be very complex and comprehensive in individual cases, if a large number of safety-related and non-safety-related processes must be controlled within a complex installation.

It is typical for such systems that the so-called user program, which defines the logical dependencies between the sensor signals and actuator signals within the installation, is created in multiple parts or modules, wherein the user generally uses a higher-level programming language which is based on international standard IEC 61131. The individual program portions are subsequently compiled, i.e., translated into a machine-readable code, and linked together. The resulting program code is then downloaded into all control units which are to execute the relevant program code.

The creation of a complex user program is often not possible in a single step. Generally, after commissioning the safety controller, there is a need for modifications and/or additions, since it may be possible to identify all interdependencies only when the installation is running. In the known safety controller, the user may modify one or multiple parts of the user program in the higher-level programming language. Subsequently, the modified user program must be recompiled, and the compiled parts must be relinked, in order to obtain machine-readable program code with the relevant modifications. The modified program code is then reloaded into the safety controller and overwrites the previous (original) program code. In the known safety controller, making a modification thus requires stopping the control process in order to enable downloading the modified program code. Subsequently, the installation must be restarted, which may be time-consuming, in particular in the case of complex installations.

In an earlier control system from Pilz GmbH & Co. KG, which was provided under the brand name PSS 3000, it was possible to transfer standard components to the memory of the control system even while the machine was running. This facilitates a later modification of a user program. However, this update option was strictly limited to program portions related to non-safety-related standard processes. The practical use of this function was therefore limited.

SUMMARY OF THE INVENTION

Against this background, it is an object of the present invention to provide a method of the kind mentioned above, which method enables a more rapid modification of the program code for the safety controller. Another object of the present invention is to provide a safety controller which may be programmed more simply and rapidly via such a method.

According to a first aspect of the present invention, there is provided a method for programming a safety controller, which has a plurality of inputs for receiving sensor signals, a plurality of outputs for outputting actuator signals, and at least one processor for executing program code, the method comprising the steps of: creating a user program which defines logical dependencies between the sensor signals and the actuator signals, using a program editor, wherein the user program has a first program portion and at least one additional program portion, and wherein the first program portion defines safety-related logical dependencies between selected sensor signals and actuator signals; compiling and linking the first and the at least one additional program portion, in order to obtain an executable original program code for the at least one processor, wherein the original program code has an original first code portion which represents the first program portion, and at least one original additional code portion which represents the at least one additional program portion; transferring the executable original program code to a first memory of the safety controller; executing the executable original program code by means of the at least one processor, in order to generate the actuator signals as a function of the sensor signals; modifying the first program portion using the program editor, in order to obtain a modified first program portion; and compiling the modified first program portion, in order to obtain a modified first code portion, wherein the modified first code portion is transferred to a second memory of the safety controller while the original program code is executed by means of the at least one processor, and wherein the modified first code portion is then executed in addition to the original additional code portion and instead of the original first code portion by means of the at least one processor, in order to generate the actuator signals as a function of the modified first program portion.

According to another aspect, there is provided a safety controller for fail-safe control of a safety-critical process, comprising a plurality of inputs for receiving sensor signals, comprising a plurality of outputs for outputting actuator signals, comprising at least one processor for cyclically executing program code, comprising a first non-volatile memory, comprising a second volatile memory, and comprising a programming tool for creating a user program which defines logical dependencies between selected sensor signals and selected actuator signals, wherein the programming tool has a program editor designed to generate a first program portion and at least one additional program portion, wherein the first program portion defines safety-related logical dependencies between some selected sensor signals and some selected actuator signals, wherein the programming tool further has a compiler designed to compile the first and the at least one additional program portion and to link it in order to form an executable original program code for the at least one processor, wherein the original program code has an original first code portion, which represents the first program portion, and at least one original additional code portion, which represents the at least one additional program portion, and wherein the programming tool is configured for transferring the original program code into the first memory, wherein the programming tool is further designed to modify and to compile the first program portion separately from the additional program portion, in order to obtain a modified first code portion, wherein the programming tool is further configured for transferring the modified first code portion into the second memory while the original program code is executed by means of the at least one processor, and wherein the safety controller is configured to execute the modified first code portion in addition to the original additional code portion and instead of the original first code portion by means of the at least one processor, in order to generate the actuator signals as a function of the modified first program portion.

The new method and the new safety controller may be implemented in a particularly advantageous manner via a computer program which enables the aforementioned method once the computer program has been implemented on the safety controller.

The new method and safety controller enable a modification of the first program portion independently of modifications in the at least one additional program portion, and a subsequent isolated compilation of the modified first program portion, in order to generate a modified first code portion, which is loaded as an isolated program code fragment into the second memory of the safety controller.

Preferably, the modified first code portion is loaded into the second memory without previous linking to the other code portions. Since the first memory with the original program code is not overwritten thereby, downloading the modified first code portion is readily possible while the original program code is executed by means of the at least one processor. Downloading the modified first code portion therefore requires no interruption and no stopping of the control process. In other words, the first program portion may be modified and the modified first code portion may be transferred to the second memory of the safety controller while the safety controller executes the original program code and thus controls the at least partially safety-critical process in the automated installation. The isolated compilation of the modified first program portion and the preferred omission of the linking to the at least one additional program portion enables a more rapid generation of a machine-readable modified code portion. A more rapid modification in the programming of the safety controller is already possible as a result of this.

In addition, the modified first code portion of the safety controller may be executed without interrupting the control process. Advantageously, the safety controller may execute the modified first code portion using the current process values of the controlled installation. This makes it possible to save a great deal of time, since the safety controller and the controlled installation must first be placed in a defined state before a restart, which may be very time-consuming in the case of a complex installation. This may be omitted due to the new method.

In some advantageous exemplary embodiments, the incorporation of the modified first code portion during the operation of the safety controller is implemented in that the safety controller is prompted by the programming tool to change a program code pointer in such a way that the modified first code portion from the second memory is executed instead of the original first code portion from the first memory, as soon as the execution of the first code portion is ready to start within the cyclical execution of the program code. In some advantageous exemplary embodiments, the modification of the program code pointer takes place at the end of a program cycle, so that the modified first code portion is executed from one program cycle to the next. The current process values of all variables are advantageously retained in this case. However, in principle, it would be conceivable that the original first code portion is overwritten by the modified first code portion, in particular if the program code is not executed directly from the first memory, but rather, for example, from a particular main memory.

In preferred exemplary embodiments, all I/O mapping between the physical inputs and outputs of the safety controller and the variables used in the program code are retained. Preferably, the modifications in the modified first code portion are therefore limited only to modified logical dependencies between the selected sensor signals and actuator signals. This facilitates rapid incorporation of the modified code portion into the control process.

Since the modified first code portion represents safety-related logical dependencies between selected sensor signals and actuator signals, the new method and the new safety controller enable a modification of the safety-related control process during the operation of the safety controller. On the one hand, this is highly advantageous, since safety-related control system components may impede and impair the control of the non-safety-related operation of the installation. Consequently, the new method and the corresponding safety controller enable, for example, a time-limited cancellation of a safety-related control process, in order, for example, to facilitate troubleshooting in the non-safety-related control process.

In advantageous exemplary embodiments, the new method and the new safety controller also enable a modification in the at least one additional program portion during operation, in that the at least one additional program portion is separately modified and compiled, and the modified additional code portion is transferred to the second memory. However, notwithstanding this, the particular feature of the new method and the new safety controller is that the first program portion, including the safety-related logical dependencies, may be modified, compiled, and transferred to the second memory of the safety controller in isolation, in the described manner. In some advantageous exemplary embodiments, the modification of the first program portion and the transfer of the modified first code portion to the second memory of the safety controller are therefore possible only after a successful identification and/or authorization of the user and a corresponding enabling by the operating system of the safety controller.

In addition, in some advantageous exemplary embodiments, it is possible to disable the execution of the modified first code portion from the second memory during the execution of the original program code, with this disabling being advantageously monitored in two channels during the execution of the original program code. These exemplary embodiments thus prevent any intervention in the safety-related control process as a function of the currently executed original program code, thus providing increased safety but impeding the implementation of modifications in individual cases. Advantageously, the new method and the new safety controller generally have the option of loading a first code portion compiled in isolation into the second memory of the safety controller, and of prompting the at least one processor for executing this code portion during operation, wherein this general option may be specifically deactivated.

In summary, the new method and the new safety controller enable a more rapid incorporation of a modified code portion which represents safety-related logical dependencies. Thus, a user is able to reprogram the new safety controller more quickly than was previously the case. The aforementioned object is thus completely achieved.

In a preferred refinement of the invention, the modified first code portion is executed instead of the original first code portion only during a limited period of time.

In this refinement, a modification of the program code according to the new method is only temporarily possible. After the limited period of time has elapsed, the at least one processor thus again executes the original first code portion instead of the modified first code portion. In some exemplary embodiments, this may take place automatically. However, the return to the original first code portion preferably requires a manual intervention, as is further explained below based on a preferred exemplary embodiment. In some advantageous exemplary embodiments, the limited period of time is ≤24 hours, advantageously ≤12 hours. In other advantageous exemplary embodiments, the limited period of time may be ≤5 hours or even ≤0.5 hours. This refinement has the advantage that, due to the new method, no permanent modification of the safety-related program code may be carried out bypassing the established and proven way of doing this. As a result, the fail-safety in the safety-related control process is increased. In particular, an ongoing reduction of the safety level, which may be advantageous when commissioning an installation for facilitating troubleshooting, is time-limited. Long term, the new safety controller operates using the original program code.

In a further refinement, the safety controller enters into a defined safe state after the limited period of time has elapsed.

In terms of this refinement, a defined safe state is a state in which the hazardous actuators are brought into their safe state. Generally, the safe state requires a manual reset or a manual restart of the safety controller for re-commissioning. In preferred exemplary embodiments, monitoring of the limited period of time is implemented in the firmware of the safety controller, preferably with two channel redundancy. Advantageously, it cannot be overridden by the user. This refinement provides further increased safety with respect to the safety-related control system.

In a further refinement, the first memory is a non-volatile memory and the second memory is a volatile memory. In terms of this refinement, a non-volatile memory is a memory which retains the transferred program code even in the case of loss of the operating voltage or supply voltage, while a volatile memory loses the stored code portions in the case of loss of the operating voltage or supply voltage. This refinement has the advantage that a restart, and preferably also a manual reset, reliably terminates the use of the modified first code portion. The flexibility and facilitation gained via the new method when troubleshooting is limited by the volatile character of the second memory in favor of improved protection of the installation.

In a further refinement, a program code pointer of the safety controller is changed in order to execute the modified first code portion instead of the original first code portion.

In this refinement, the safety controller has both first code portions, effectively in coexistence. By changing the program code pointer, which—in a manner known per se—points to the next machine code command in the memory of the control system, very rapid switching to the modified first code portion is possible. In addition, due to the coexistence of the two code portions, it is easily possible to switch back to the original code portion. Alternatively, it would generally be conceivable that the modified first code portion is transferred from the second memory to the first memory and overwrites the original first code portion there. In contrast, the preferred refinement simplifies the aforementioned temporary execution of the modified first code portion.

In a further refinement, the at least one processor executes the original program code cyclically, and the modified first code portion is executed instead of the original first code portion after the completion of a program cycle.

This refinement enables a defined, seamless transition from the original first code portion to the modified first code portion during the operation of the safety controller. In this refinement, the modified first code portion advantageously receives current process values, so that the control process may be seamlessly executed despite the modification.

In a further refinement, the safety controller has a visual indicator via which the execution of the modified first code portion is visually indicated. In advantageous exemplary embodiments, the visual indicator indicates the execution of the modified first code portion during the entire period of time, starting from the incorporation of the modified first code portion until the limited period of time has elapsed, and/or until a manual reset or restart, i.e. as long as the modified first code portion is "active". This refinement is advantageous with respect to the fail-safety of the controlled process operation, since the deviation from the original program code may result in a change in the safety level and is advantageously indicated in this refinement.

In a further refinement, the modified first program portion, together with the at least one additional program portion, is compiled and linked in order to obtain a modified executable program code, and the modified executable program code is transferred to the first memory after the execution of the original program code has been stopped.

In this refinement, the modified first program portion is permanently integrated into the executable program code and is effectively loaded into the safety controller as "new original program code" without a time limit. This refinement is advantageous in order to permanently implement a modification in the first program portion in the new safety controller following a first test phase. Advantageously, the modified executable program code overwrites the original executable program code in the first memory.

In a further refinement, the modified first program portion is compiled twice in order to generate a modified first code portion and a modified second code portion, wherein the modified first code portion and the modified second code portion are transferred to the second memory and are executed redundantly by means of the at least one processor.

This refinement is particularly advantageous in order to ensure single-fault safety during the execution of the safety-related first program portion, also after the modification. Advantageously, the original first program portion is compiled twice, wherein the modified first code portion and the modified second code portion are executed in the described manner, instead of the original first and an original second code portion. Furthermore, it is preferred if the first code portion and the second code portion are executed on separate processors, in order thereby to implement two separate channels which function as part of a multiple-channel, redundant design. This refinement provides a high degree of fail-safety, which is also maintained for the new option for rapidly modifying a safety-related program portion. In addition, this refinement has the advantage that the modified first program portion is executed in the safety controller under actual conditions, thus facilitating a permanent incorporation in terms of the above-described refinement.

In a further refinement, the safety controller is a distributed safety controller including a plurality of networked control units, on each of which an individual program code is executed, wherein the modified first code portion is transferred to at least two different control units while the original program code is executed. In preferred exemplary embodiments, the distributed safety controller comprises a central memory in which the modified first code portion is provided, and the at least two different control units load the modified first code portion from the central memory into their respective first memory. This refinement enables the modification of a complex aspect and/or object-oriented user program in a distributed safety controller in a simple, convenient and rapid manner, wherein the modifications may be executed and thus tested in multiple control units under actual conditions. In advantageous exemplary embodiments, the programming tool is designed to ascertain all networked control units on which the original first program portion is executed, in order to subsequently prompt all affected control units to load the modified first code portion into the respective second memory and to execute it in the described way. In some preferred exemplary embodiments, the programming tool is designed to compile the modified first program portion differently for the at least two different control units, in order to execute the modified first program portion on different hardware platforms.

In a further refinement, the modification of the first program portion is enabled or disabled as a function of a user identification.

In this refinement, a user who would like to modify the first program portion must first successfully undergo an identification procedure. In some exemplary embodiments, the user identification may include the input of a password. Alternatively or in addition, the user identification may be carried out based on an electronic and/or mechanical key. This refinement provides increased security against manipulation and unintentional intervention in the safety-related control process.

In a further refinement, the transfer of the modified first code portion to the second memory is logged in an additional memory with a date stamp. Preferably, the additional memory is a non-volatile memory.

This refinement has the advantage that any modification to the safety-related first program portion is automatically documented even if it is only temporarily possible, and may thus also be traced later. On the one hand, this facilitates troubleshooting and optimization of the program code when programming the safety controller. On the other hand, it is easier to identify and prevent manipulation or manipulation attempts.

It is to be understood that the aforementioned features and the features to be explained hereinafter are applicable not only in each specified combination, but also in other combinations or alone, without departing from the scope of the present invention.

BRIEF DESCRIPTION OF THE DRAWINGS

Exemplary embodiments of the present invention are depicted in the drawings and are explained in greater detail in the description below. In the drawings.

DESCRIPTION OF PREFERRED EMBODIMENTS

Figure 1:
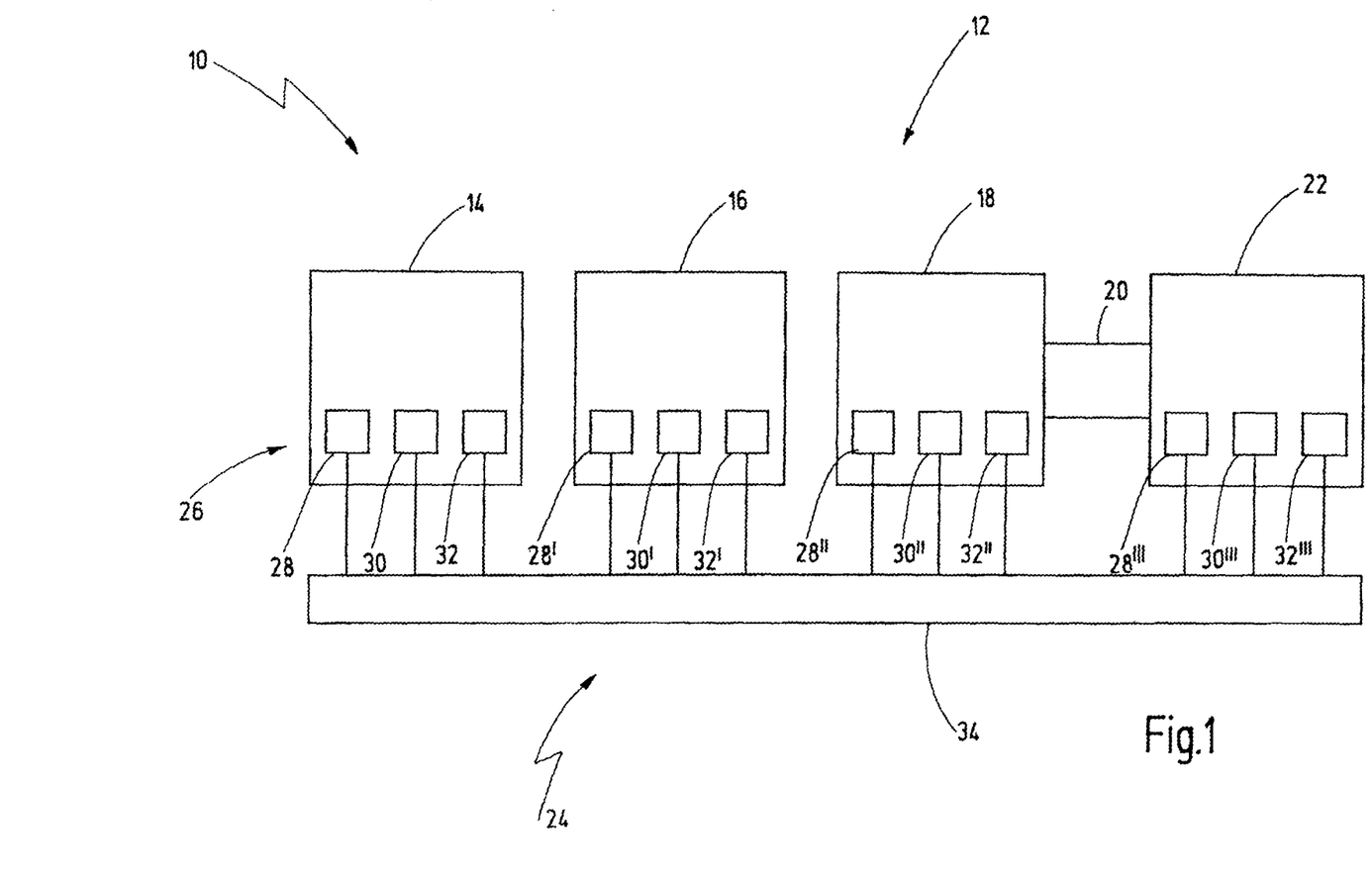
FIG. 1 shows a highly schematic representation of a complex installation including a distributed safety controller according to an exemplary embodiment of the present invention.

In FIG. 1, reference numeral 10 designates an installation in its entirety, which installation is controlled via an exemplary embodiment of the new safety controller. The installation 10 includes a plurality of installation components 12. In the present exemplary embodiment, these are a placement station 14, a processing station 16, a test station 18, a conveying unit 20, and a packing and palletizing station 22. Workpieces are automatically fed to the processing station 16 via the placement station 14, which, for example, may include a robot. These workpieces are processed in the processing station 16. Subsequently, the processed workpieces are forwarded to the test station 18, in which it is checked whether the processed workpiece meets predefined test criteria. If these test criteria are met, the workpiece is transferred by means of the conveying unit 20 to the packing and palletizing station 22. At this station, multiple workpieces are combined into packages, which are then stacked onto a pallet. The installation 10 is thus exemplary of a plurality of installations which are automatically controlled, wherein safety-related and non-safety-related processes are combined into an overall process.

Here, reference number 24 designates a safety controller according to an exemplary embodiment of the present invention in its entirety. The safety controller 24 includes a plurality of hardware components 26, in particular in the form of programmable control units 28, sensor devices 30 and actuator devices 32, as well as software components including a user program which is created here according to the new method. In preferred exemplary embodiments, the sensor devices 30 and actuator devices 32 are modularly assembled I/O devices to which a plurality of different sensors and actuators may be connected, such as position switches, rotary encoders, temperature sensors, solenoid valves, contactors, and/or electric drives. In preferred exemplary embodiments, a control unit may form a combined assembly together with a modular sensor and actuator device, as is known in principle from the aforementioned automation system PSS 4000.

Advantageously, the control units, sensors, and actuators each are associated with one of the installation components 12. The control system hardware components 26 are advantageously interconnected via a communication network 34. The communication network may include an Ethernet-based bus system as provided and marketed by Pilz GmbH & Co. KG under the brand name SafetyNET P®. Alternatively or in addition, the communication network 34 may include additional bus systems which are in particular designed for the cyclical data traffic in an automated control system.

The work areas of the individual stations 14, 16, 18, 22 may be safeguarded, for example, by safety doors which permit access to the hazardous work area of each station only if the associated control unit has brought the respective station into a safe state. Alternatively or in addition, light grids or light curtains may be used. In addition, the individual stations 14, 16, 18, 22 may be provided with emergency-stop buttons, via which each station may be transferred into a safe state, in particular by disconnecting the power supply. For this purpose, contactors are generally activated, which are arranged in the current supply path for each station.

The aforementioned safety doors, light grids, light curtains, and emergency-stop buttons are typical safety-related sensors, whose output signals are logically linked in order to activate safety-related actuators, such as the contactors in the current supply path of the stations, as a function thereof. In addition, the sensors 30 of a station may include numerous non-safety-related sensors which are required for controlling the operation and, for example, detect operational rotational speeds, angles, positions, or speeds which are required for controlling the operation. The actuators 32 may likewise include non-safety-related actuators, in particular motors or actuating cylinders.

In the present exemplary embodiment, a separate control unit 28 is associated with each station 14, 16, 18, 22. It is alternatively possible to control multiple stations of an installation via a common control unit. The installation components may be structurally and spatially separated from each other. However, it is also conceivable that multiple installation components are connected to form an integrated station.

FIG. 1 depicts functionally identical components having identical reference numerals, wherein primes indicate that the respective components may be implemented differently. The same also applies to signals. This type of identification also applies to the other figures.

Figure 2:
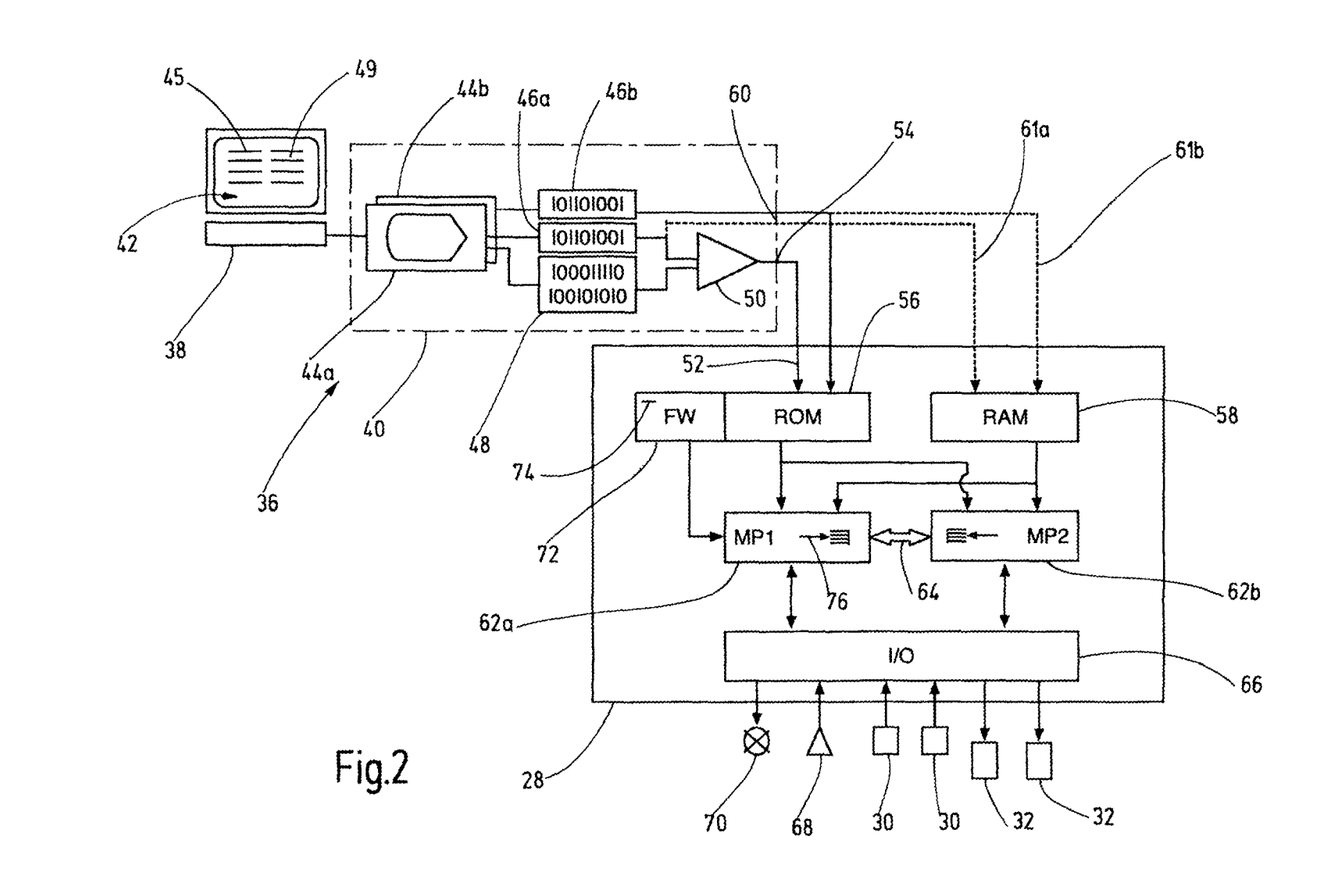
FIG. 2 shows a schematic representation of a single control unit of the installation from FIG. 1.

FIG. 2 depicts a single control unit 28 together with a programming tool 36. In preferred exemplary embodiments, the programming tool is a PC 38 on which a computer program (software) 40 is executed. The computer program 40 provides a program editor 42 on PC 38, which makes it possible for a user to create a user program for the control unit 28 and/or for a plurality of control units 28, 28', 28'' etc. in a programming language which is convenient for the user. Preferably, the program editor provides one or multiple programming languages which are based on the Standard EN 61131. These include, for example, a programming language which enables the definition of logical dependencies between selected sensor signals and selected actuator signals in graphical form, in particular, based on so-called functional blocks. The programming tool 36 further includes a compiler 44, by means of which a program portion created in a higher-level programming language may be translated into a machine code which is machine-readable and executable by the control system 28. In preferred exemplary embodiments, the programming tool includes a first compiler 44a and a second compiler 44b which generate two separate executable program codes from a safety-related program portion 45, which are subsequently executed redundantly by one or multiple processors in order to achieve higher fail-safety. In the depicted exemplary embodiment, reference numeral 46a identifies a first code portion, which was generated by the first compiler 44a from the first program portion 45, and which defines safety-related logical dependencies in a machine-readable form. Reference numeral 46b identifies a second code portion, which the second compiler 44b generated from the first program portion 45. The second code portion 46b represents the same logical dependencies as the first code portion 46a, but in a redundant and preferably diverse implementation. In some preferred exemplary embodiments, the code portions 46a, 46b may be compiled for different processors. In principle, however, execution of the code portions 46a, 46b on one processor or on multiple processors of the same type is conceivable.

Reference numeral 48 identifies an additional code portion which, in this exemplary embodiment, was generated by means of the first compiler 44a from an additional program portion 49. The additional code portion 48 represents logical dependencies between selected sensor signals and actuator signals which do not relate to safety-related functions. Therefore, in this exemplary embodiment, the code portion 48 is a code portion for a standard process, whereas the redundant code portions 46a, 46b are used for controlling a safety-related process.

Reference numeral 50 identifies a linker, by means of which multiple code portions 46a, 48 may be linked to form an executable program code for the control system 28. It should be noted that in addition to the code portions depicted here only by way of example, the new method may generate a plurality of code portions, of which some are safety-related and others are non-safety-related. Typically, linker 50 puts together a plurality of code portions to form an executable program code 52. In particular, in some exemplary embodiments, it is possible that multiple safety-related code portions are assembled to form an executable program code.

Programming tool 36 has a first interface 54 via which the executable program code 52 may be transferred to a first memory 56 of the control unit 28. In preferred exemplary embodiments, first memory 56 is a non-volatile memory, for example, in the form of an EEPROM, which is fixedly integrated into the control unit 28. Alternatively or in addition, the first non-volatile memory 56 may be a flash memory, for example, in the form of an SD card.

Reference numeral 58 identifies a second memory in the control unit 28, which is a volatile memory in preferred exemplary embodiments. Programming tool 36 has an additional interface 60, via which in particular a modified first code portion 61a and a modified second code portion 61b may be transferred to the memory 58.

Here, reference numerals 62a, 62b identify two microprocessors, which operate redundantly with respect to one another in the preferred exemplary embodiments of the control unit 28. A double arrow 64 indicates that the microprocessors 62a, 62b are able to compare and/or reciprocally check their processing results. In preferred exemplary embodiments, microprocessor 62a executes the first safety-related code portion 46a and the non-safety-related code portion 48, while second microprocessor 62b executes the second safety-related code portion 46b. Generally, it is preferred if at least the safety-related code portions are executed by the control unit 28 redundantly in two channels, in order to achieve high fail-safety corresponding to the requirements of SIL3 and/or PL e in terms of the aforementioned standards. However, in principle, a fail-safe implementation of the control unit 28 may also be possible in another way.

Reference numeral 66 identifies an I/O interface, via which the control unit 28 may read in current process values from sensors 30 and may output current process values for controlling the actuators 32. In preferred exemplary embodiments, the I/O interface includes a bus interface for connecting the control unit 28 to the communication network 34.

In some exemplary embodiments, I/O interface 66 includes an interface for routing a user identification 68. In some exemplary embodiments, user identification may include inputting a password and/or reading in an electronic and/or mechanical key. Alternatively or in addition, the interface for reading in the user identification may be implemented in the programming tool 36 (not depicted here).

Reference numeral 70 designates a visual indicator, which, for example, is implemented in the form of a signal light. In preferred exemplary embodiments, visual indicator 70 indicates when a modified first code portion 61a is executed by the control unit 28, as explained below.

Reference numeral 72 designates an additional non-volatile memory, in which the so-called firmware of the control unit 28 is stored. The firmware includes an operating system, by means of which the control unit 28 is enabled to execute code portions 46a, 46b, 48, which were loaded via the programming tool 36 into the memories 56, 58. In preferred exemplary embodiments, a defined period of time 74 is stored in the firmware, which temporally limits the execution of a modified first code portion 61a and a modified second code portion 61b.

In this exemplary embodiment, each of the microprocessors 62a, 62b has a program code pointer 76, which respectively points to the next instruction code to be executed within the cyclically executed program code, in a manner known per se. In some preferred exemplary embodiments, the program code pointer 76 in each of the two microprocessors 62a, 62b is modified by means of firmware 72 and by means of the programming tool 36 in such a way that the processor 62a temporarily executes a modified first code portion 61a and the processor 62b temporarily executes a modified second code portion 61b.

Figure 3:
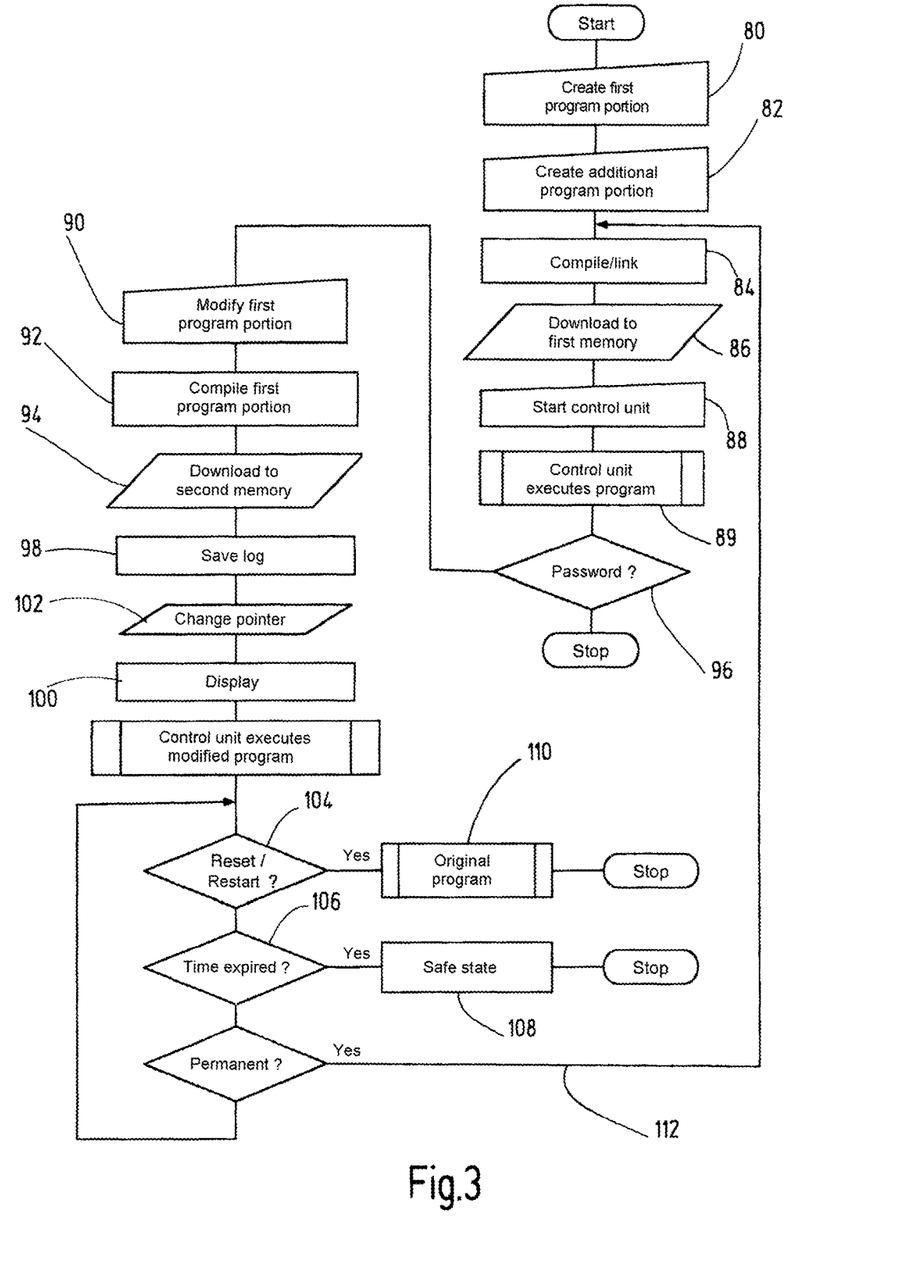
FIG. 3 shows a flow chart for explaining an exemplary embodiment of the new method.

FIG. 3 illustrates a preferred exemplary embodiment of the new method based on a simplified flow chart. According to step 80, a user who would like to program the safety controller 24 creates at least one first program portion, which defines safety-related logical dependencies between selected sensor signals and selected actuator signals. In short, the user creates at least one FS program portion. In practical exemplary embodiments, the FS program portion may be made up of a plurality of FS program modules, so that the first program portion may be divided into additional sub-program portions.

According to step 82, the user creates at least one additional program portion, in which no safety-related logical dependencies between sensor signals and actuator signals are typically defined. In short, in step 82, the user creates an ST program portion.

According to step 84, the program portions from steps 80, 82 are compiled and linked to form an executable program code for safety controller 24. In preferred exemplary embodiments, the first program portion (FS program portion) is compiled twice by means of the two compilers 44a, 44b in order to generate two redundant FS code portions. In some exemplary embodiments, only one of the two redundant FS code portions is linked to the ST code portion from step 82. However, in other exemplary embodiments, the ST code portion may be linked to one of each of the two FS code portions to form executable program code.

According to step 86, the executable program code is downloaded to the first memory of the safety controller. Subsequently, according to step 88, the safety controller 24 is put into operation so that the downloaded program code is executed by means of the processors in the safety controller. The safety controller 24 executes the program code from the first memory in a cyclically repeated manner in a manner known per se, wherein it reads in current process values from sensors 30, and in each cycle, determines current process values for the actuators 32 and outputs them to the actuators via the I/O interface (step 89).

According to a preferred exemplary embodiment, the user may make a modification in the first program portion during the execution of the program code (step 90), recompile the modified first program portion (step 92), and according to step 94, download the modified code portion thus obtained into the second memory of the safety controller. In the preferred exemplary embodiments, a user identification is previously required which, for example, includes a password query 96. As already indicated above, step 92 may include a double compilation of the modified first program portion in order to obtain two redundant modified code portions 61a, 61b.

According to step 98, downloading of the modified first code portion is logged with a time stamp. In preferred exemplary embodiments, the log, along with the time stamp, is stored in a non-volatile memory of programming tool 36 and/or safety controller 24. Furthermore, according to step 100, the indicator 70 is activated.

According to step 102, which may also be carried out before activating the visual indicator, the program code pointer of the at least one processor of the safety controller is changed by means of the programming tool 36 and/or the firmware 72 in such a way that it now points to the modified first code portion in the volatile memory 58 as soon as the safety-related first code portion is to be executed within the scope of the cyclical execution of the program code from the first memory 56. As a result, the modified first code portion 61a from the volatile memory 58 is now executed, instead of the original first code portion 46a from the first memory 56. In preferred exemplary embodiments, the redundant modified second code portion 61b from the volatile memory 58 is likewise executed, instead of the redundant original second code portion 46b from the memory 56.

The cyclical execution of the program code, including the modified safety-related code portions, is time-limited in preferred exemplary embodiments. Therefore, according to step 104, a query is made as to whether the safety controller is to return to the original program code via a software reset or a restart. If this is not the case, according to step 106, a check is made as to whether the maximum time limit 74 for the temporary execution of the modified program code has been reached. If in the affirmative, in the preferred exemplary embodiment, the firmware of the safety controller 24 ensures that the safety controller, and thus the installation 10, enters a safe state (step 108), from which a manual restart is required. According to step 110, the safety controller executes the original, non-modified program code after the manual restart.

If the user would like to have the modified program code executed permanently, according to step 112, the user must recompile and link the modified first program portion together with the additional program portion. The modified program code is thus transferred into the non-volatile memory 56 of the safety controller 24 as new original program code.

In preferred exemplary embodiments, using the new method, only logical dependencies in the first program portion 45 may be modified, but no I/O assignments between physical connections of the safety controller 24 and process variables (so-called I/O mapping). In the preferred exemplary embodiments, modification of the hardware of the safety controller 24 is also excluded as long as the safety controller 24 executes the program code. In other words, such modifications must be carried out by the user if the safety controller 24 is decommissioned and carries out no current control functions.

In the preferred exemplary embodiments, the modification in the first program portion and the resulting modification of the first code portion are non-persistent. This means that the program code originally transferred to the safety controller is not overwritten, but is retained unchanged. In the preferred exemplary embodiments, according to the new method, the modifications are carried out only in the volatile memory 58. As a result, the safety controller returns to the original program code after executing the reset command or via a restart, for example, after disconnecting the supply voltage. In the preferred exemplary embodiments, a permanent modification of the program code requires re-downloading the full compiled and linked program code.

As already indicated above, in the preferred exemplary embodiments, programming tool 36 determines all control units 28, 28', 28" etc. on which a modified first code portion 61a is to be executed. In the preferred exemplary embodiments, subsequently, programming tool 36 provides the modified first code portion (and preferably also the modified second code portion for the redundant execution) for incorporation into all affected control units. Consequently, the program code pointers in all affected control units are subsequently temporarily rerouted to the modified code portion.

From an organizational point of view, it is the responsibility of the user to carry out a specific risk analysis for the modification in the first program portion 45. If applicable, the user has to ensure that in the case of a reduced safety level, hazards for persons in the vicinity of the controlled installation are managed in a different way.

What is claimed is:

1. A method for programming a safety controller, which has a plurality of inputs for receiving sensor signals, a plurality of outputs for outputting actuator signals, and at least one processor for executing program code establishing a control process for the safety controller, the method comprising the steps of:
creating a user program which defines logical dependencies between the sensor signals and the actuator signals, using a program editor, wherein the user program has a first program portion and at least one additional program portion, and wherein the first program portion defines safety-related logical dependencies between selected sensor signals and actuator signals, and is distinct from said at least one additional program portion,
compiling and linking the first program portion and the at least one additional program portion, in order to obtain an executable original program code for the at least one processor, wherein the original program code has an original first code portion which represents the first program portion, and at least one original additional code portion which represents the at least one additional program portion,
transferring the executable original program code to a first memory of the safety controller,
executing the executable original program code by means of the at least one processor, in order to generate the actuator signals as a function of the sensor signals,
modifying the first program portion using the program editor, in order to obtain a modified first program portion, and
compiling the modified first program portion, in order to obtain a modified first code portion,
wherein the modified first code portion is transferred to a second memory of the safety controller while the original program code is executed by means of the at least one processor, and
wherein the modified first code portion is then executed in addition to the original additional code portion and instead of the original first code portion by means of the at least one processor without interrupting the control process, in order to generate the actuator signals as a function of the modified first program portion.

2. The method of claim 1, wherein the modified first code portion is executed instead of the original first code portion only during a limited period of time.

3. The method of claim 2, wherein the safety controller enters into a defined safe state after the limited period of time has elapsed.

4. The method of claim 1, wherein the first memory is a non-volatile memory and the second memory is a volatile memory.

5. The method of claim 1, wherein a program code pointer of the safety controller is changed in order to execute the modified first code portion instead of the original first code portion.

6. The method of claim 1, wherein the at least one processor executes the original program code in a cyclical manner defining a plurality of program cycles, and wherein the modified first code portion is executed instead of the original first code portion after completion of one of the plurality of program cycles.

7. The method of claim 1, wherein the safety controller has a visual indicator via which execution of the modified first code portion is indicated.

8. The method of claim 1, wherein the modified first program portion, together with the at least one additional program portion, is compiled and linked in order to obtain a modified executable program code, and wherein the modified executable program code is transferred to the first memory after execution of the original program code has been stopped.

9. The method of claim 1, wherein the modified first program portion is compiled twice in order to generate a modified first code portion and a modified second code portion, wherein the modified first code portion and the modified second code portion are transferred to the second memory and are executed redundantly by means of the at least one processor.

10. The method of claim 1, wherein the safety controller is a distributed safety controller including a plurality of networked control units, on which an individual program code is respectively executed, wherein the modified first code portion is transferred to at least two different control units while the original program code is executed.

11. The method of claim 1, wherein the modification of the first program portion is enabled or disabled as a function of a user identification.

12. The method of claim 1, wherein the transfer of the modified first code portion to the second memory is logged in an additional memory together with a date stamp.

13. A safety controller for fail-safe control of a safety-critical process, comprising:
 a plurality of inputs for receiving sensor signals,
 a plurality of outputs for outputting actuator signals,
 at least one processor for cyclically executing program code,
 a first non-volatile memory,
 a second volatile memory, and
 a programming tool for creating a user program which defines logical dependencies between selected sensor signals and selected actuator signals,
 wherein the programming tool has a program editor designed to generate a first program portion and at least one additional program portion,
 wherein the first program portion defines safety-related logical dependencies between some selected sensor signals and some selected actuator signals, and is distinct from the at least one additional program portion,
 wherein the programming tool further has a compiler designed to compile the first program portion and the at least one additional program portion and to link them in order to form an executable original program code for the at least one processor which establishes a control process for the safety controller,
 wherein the original program code has an original first code portion, which represents the first program portion, and at least one original additional code portion, which represents the at least one additional program portion, and
 wherein the programming tool is configured for transferring the original program code into the first memory,
 wherein the programming tool is further designed to modify and to compile the first program portion separately from the additional program portion, in order to obtain a modified first code portion, and
 wherein the programming tool is further configured for transferring the modified first code portion into the second memory while the original program code is executed by means of the at least one processor, and
 wherein the safety controller is configured to execute the modified first code portion in addition to the original additional code portion and instead of the original first code portion by means of the at least one processor without interrupting the control process, in order to generate the actuator signals as a function of the modified first program portion.

14. A non-transitory computer readable data storage medium encoded with a computer program for a safety controller for fail-safe control of a safety-critical process, wherein the safety controller has a plurality of inputs for receiving sensor signals, a plurality of outputs for outputting actuator signals, at least one processor for cyclically executing the computer program which establishes a control process for the safety controller, a first non-volatile memory, a second volatile memory, and a programming tool for creating a user program which defines logical dependencies between selected sensor signals and selected actuator signals, and wherein the computer program is designed to execute a method comprising the steps of:
 creating a user program which defines logical dependencies between the sensor signals and the actuator signals, using a program editor, wherein the user program has a first program portion and at least one additional program portion, and wherein the first program portion defines safety-related logical dependencies between selected sensor signals and actuator signals, and is distinct from the at least one additional program portion,
 compiling and linking the first program portion and the at least one additional program portion, in order to obtain an executable original program code for the at least one processor, wherein the original program code has an original first code portion which represents the first program portion, and at least one original additional code portion which represents the at least one additional program portion,
 transferring the executable original program code to a first memory of the safety controller,
 executing the executable original program code by means of the at least one processor, in order to generate the actuator signals as a function of the sensor signals,
 modifying the first program portion using the program editor, in order to obtain a modified first program portion, and
 compiling the modified first program portion, in order to obtain a modified first code portion,
 wherein the modified first code portion is transferred to a second memory of the safety controller while the original program code is executed by means of the at least one processor, and
 wherein the modified first code portion is then executed in addition to the original additional code portion and instead of the original first code portion by means of the at least one processor without interrupting the control process, in order to generate the actuator signals as a function of the modified first program portion.

\* \* \* \* \*